No. 876,681. PATENTED JAN. 14, 1908.
C. & G. F. BATKE.
COMBINED THRESHER AND SEPARATOR.
APPLICATION FILED APR. 3, 1907.
2 SHEETS—SHEET 1.
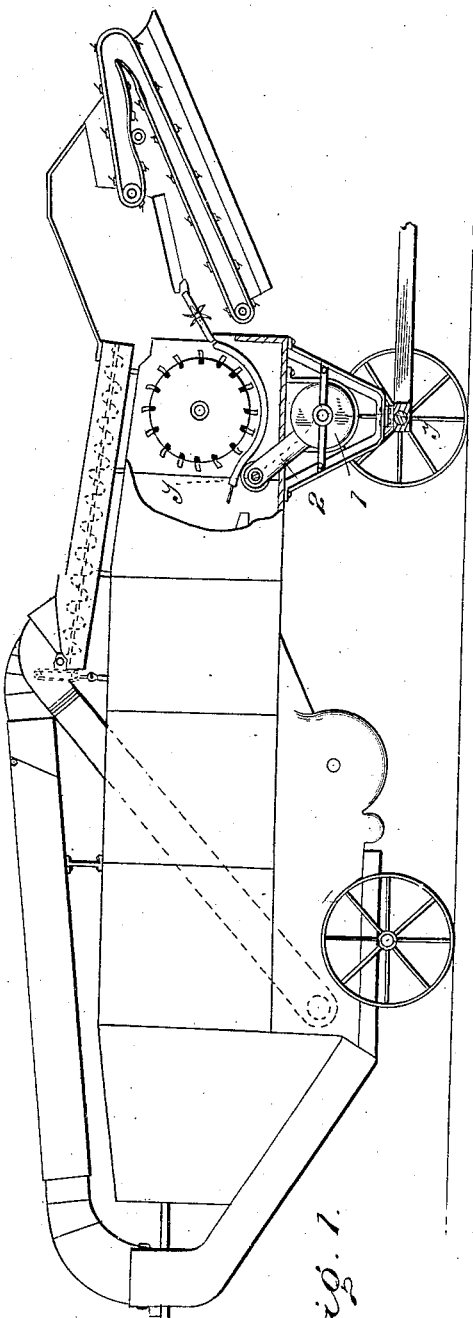
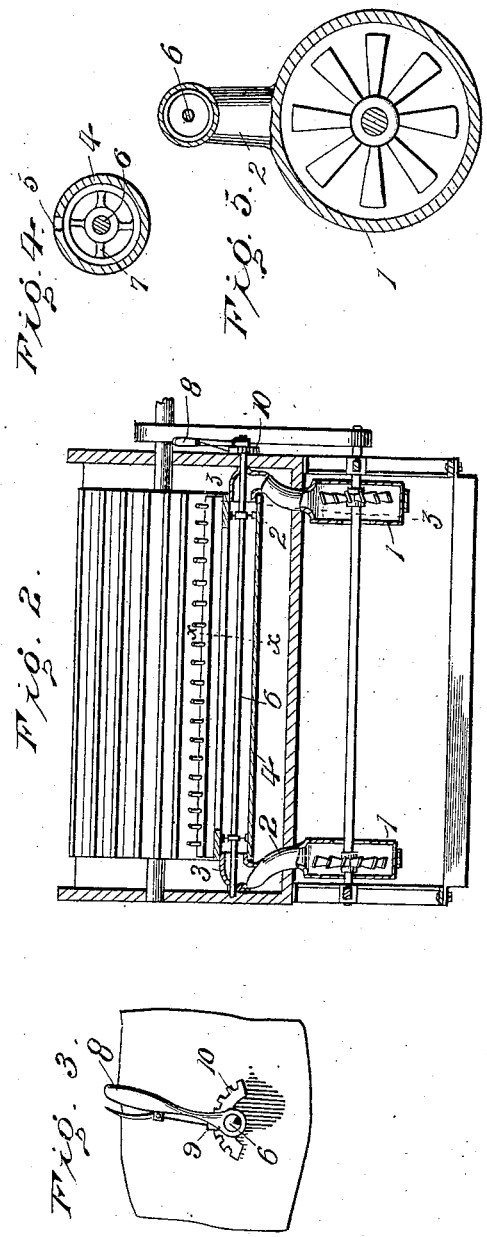
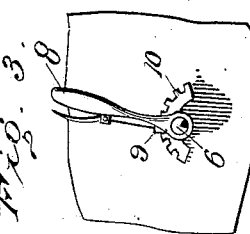
Witnesses
Inventors
C. Batke
G. F. Batke
By
Attorneys No. 876,681. PATENTED JAN. 14, 1908.
C. & G. F. BATKE.
COMBINED THRESHER AND SEPARATOR.
APPLICATION FILED APR. 3, 1907.
2 SHEETS—SHEET 2.
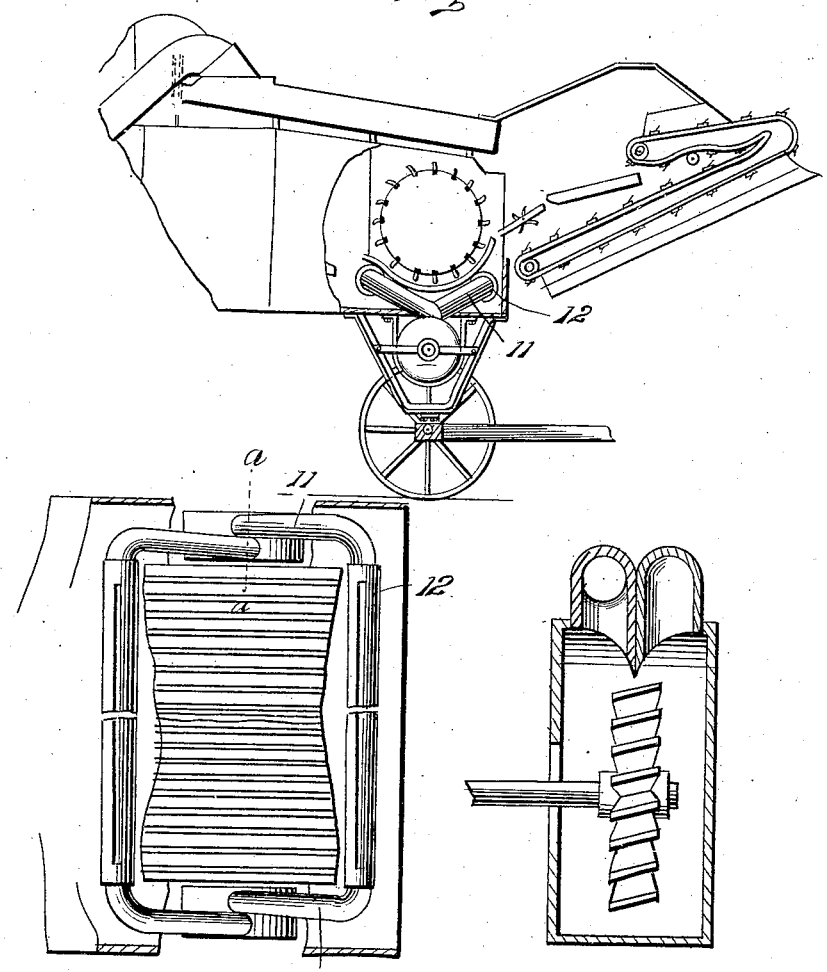

UNITED STATES PATENT OFFICE.

CHARLES BATKE, OF WATERTOWN, SOUTH DAKOTA, AND GEORGE F. BATKE, OF OHATON, ALBERTA, CANADA.

COMBINED THRESHER AND SEPARATOR.

No. 876,681.

Specification of Letters Patent.

Patented Jan. 14, 1908.

Application filed April 3, 1907. Serial No. 366,149.

*To all whom it may concern:*

Be it known that we, CHARLES BATKE, residing at Watertown, Codington county, State of South Dakota, citizen of the United States, and GEORGE F. BATKE, residing at Ohaton, Alberta, Canada, subject of the King of England, have invented certain new and useful Improvements in Combined Threshers and Separators, of which the following is a specification.

This invention has for its object to prevent the choking of threshing machines and to insure a thorough separation of the grain, and aims to devise novel means for utilizing air to attain the desired results, said means providing for changing the angle or direction of the blast of air employed for loosening and lightening the grain in the operation of the machine.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a combined thresher and separator embodying the invention. Fig. 2 is a transverse section of the separator on the line $y$—$y$ of Fig. 1 showing the parts on a larger scale. Fig. 3 is a detail view showing the means for holding the blast pipe in an adjusted position. Fig. 4 is a transverse section of the blast pipe on the line $x$—$x$ of Fig. 2. Fig. 5 is a transverse section of the blast pipe and fan blower on the line $z$—$z$ of Fig. 2 showing the parts on a larger scale. Fig. 6 is a view somewhat similar to Fig. 1 of a modification. Fig. 7 is a top plan view of the threshing mechanism and pneumatic appliances of the modification showing the parts on a larger scale. Fig. 8 is a transverse section on the line $a$—$a$ of Fig. 7 showing the parts on a larger scale.

Corresponding and like parts are referred to in the following description and indicated in all the views of the drawings by the same reference characters.

The machine illustrated in Figs. 1 and 6 comprising the feeder, the threshing mechanism and the separator, is of ordinary construction and is selected to illustrate the application of the invention which as stated herein, resides in the pneumatic appliances, whereby an air blast is created and directed upon the grain, either preliminary to being threshed, or subsequent to the threshing operation, or both before and after the threshing operation.

In combined threshing and separating machines, as ordinarily constructed, a space is formed directly below the threshing mechanism. The present invention utilizes this space, thereby avoiding the necessity for special construction of the machine or necessitating expensive changes in the organization thereof.

Fan blowers 1 are arranged in the space below the threshing mechanism and above the front axle. A pipe 2 extends from the casing of each fan blower and inclines upwardly and rearwardly and terminates in a horizontal extension 3. The horizontal extensions 3 of the pipes 2 aline transversely and are connected by means of a pipe 4 which fits the terminal portions of the said horizontal extensions 3 by means of a slip joint. The pipe 4 is provided in one side with a longitudinal slot 5 extending nearly the entire length thereof and through which a blast of air is discharged. When the fan blowers are in operation, each delivers a blast of air into an end portion of the blast pipe 4 and the air escapes from said blast pipe through the slot 5, and coming in contact with the grain, loosens and lightens the same as well as serving to carry off chaff and other light material. A shaft 6 passes centrally through the blast pipe 4 and through the horizontal extensions 3 of the air pipes 2 and is supported at, or near, its ends in bearings provided in the side pieces of the separator and in bearings at the outer sides, or ends of the horizontal extensions 3. Spiders 7 are secured within end portions of the blast pipe 4 and their hub portions receive the shaft 6. The spiders 7 are made fast to the blast pipe and the shaft 6 is secured to the spiders; hence upon turning the shaft 6 either to the right or to the left, the blast pipe is correspondingly moved and the position of the slot 5 varied so as to throw the blast of air either vertically or at any desired inclination with reference to the horizontal. A lever 8 is secured to the outer end of the shaft 6 and is provided with the usual hand latch 9 to coöperate with a notched segment 10 to hold the blast pipe in the required adjusted position. As indicated in Fig. 1, the blast pipe 4 is arranged immediately in the rear of the threshing mechanism and in advance of the straw rack so as to deliver a blast of air upon the grain as it passes from the concave of the threshing mechanism to the rack of the separator, thereby loosening and lightening the grain and insuring a maximum separation of the grain from the straw. According to the nature of the material being operated upon and according to the strength of the air blast, the latter may be delivered with a greater or less effective force upon the grain by turning the blast pipe so as either to project the blast vertically, or at an angle with reference to the vertical.

In the construction shown in Fig. 6 and in the detail view 7 and 8 thereof, other air pipes 11 lead from the casing of the fan blowers and incline upwardly and forwardly and terminate in inner horizontal extensions which are connected by means of a blast pipe in a manner similar to the inner horizontal extensions 3 of the air pipe 2. The blast pipe 12 is located forward of the threshing mechanism and delivers a blast of air upon the grain preliminary to its entrance into the threshing mechanism, thereby serving to loosen the same and in a measure preventing a too rapid feed which would be likely to choke the machine and render shutting down of the same necessary in order to remove the obstructing material.

Having thus described the invention, what is claimed as new is:

1. In a combined thresher and separator, the combination of air pipes at opposite sides of the machine and having inner horizontal extensions, a blast pipe coupled to the said inner horizontal extensions and having a lateral discharge, a shaft passed centrally through the blast pipe and the said inner horizontal extensions, spiders located within the blast pipe and fast thereto and receiving the said shaft to which they are made fast so as to turn therewith, a lever secured to the outer end of the shaft to effect turning thereof, and means for securing the lever in an adjusted position.

2. In a combined thresher and separator, fan blowers located in the space formed below the threshing mechanism, air pipes extended from the casings of the fan blowers and terminating in inner horizontal extensions which aline transversely, a blast pipe connecting the said inner horizontal extensions and having a lateral discharge, a shaft passed centrally through the blast pipe and the said inner horizontal extensions and journaled with reference to the latter, spiders arranged within the blast pipe and fast thereto and to the said shaft, a lever attached to the said shaft and means for securing the lever to the blast pipe in an adjusted position.

In testimony whereof we affix our signatures in presence of two witnesses.

CHARLES BATKE. [L. S.]
  GEORGE F. BATKE. [L. S.]

Witnesses for Charles Batke:
 H. G. HUNDRECHUNK,
 GEORGE KLINGE.
Witnesses for George F. Batke:
 W. D. POTTER,
 ED. H. DAWSON.